UNITED STATES PATENT OFFICE.

JAMES R. HOWELL, OF BUFFALO, NEW YORK.

COMPOSITION OF MATTER TO BE USED IN THE ORNAMENTATION OF MOLDINGS AND PICTURE-FRAMES AND THE MANUFACTURE OF LIGHT HOLLOW WARE, TOYS, TRAYS, &c.

SPECIFICATION forming part of Letters Patent No. 246,391, dated August 30, 1881.

Application filed January 21, 1881. (No specimens.)

*To all whom it may concern:*

Be it known that I, JAMES R. HOWELL, a citizen of the United States, residing at Buffalo, in the county of Erie and State of New York, have invented a new and useful Composition of Matter to be Used in the Ornamentation of Moldings and Picture-Frames and the Manufacture of Light Hollow Ware, Toys, Trays, &c., of which the following is a specification.

My composition consists of the following ingredients combined in substantially the proportions stated, viz: glue, eight pounds; rosin, six pounds; paper-pulp, two pounds; boiled linseed-oil, two quarts. The glue and rosin are dissolved by heat, the oil and paper-pulp added thereto, and the entire mass, being thoroughly heated, is kept hot and admixed by agitation until reduced to a uniform consistency. The compound is then thickened by the addition thereto of whiting in a powdered state until it has assumed the consistency of a plastic paste stiff enough to admit of being pressed and molded into any desired form.

It is evident that the precise proportions of the several ingredients as stated may be somewhat varied without affecting materially the general result or the quality and peculiar characteristics of the resulting compound.

The hot paste produced as above described is fashioned, while yet hot, into such forms as may be desired, by pressing it into molds or turning it up and manipulating it in the same manner as is done with potters' clay. Upon cooling the compound will harden and form a tough durable substance, admirably adapted for many useful and ornamental purposes.

I contemplate the addition of any desired pigments or coloring-matter to the composition, as taste or fancy may dictate, and the combination, likewise, of different colors, shades, and tints of the composition in the manufacture of any given object therewith.

I claim as my invention—

The within-described composition of matter, consisting of glue, rosin, paper-pulp, and boiled linseed-oil, admixed in substantially the proportions, and thickened to a paste, while hot, by the addition of whiting, substantially as and for the purpose herein set forth.

J. R. HOWELL. [L. S.]

In presence of—
BERNARD J. KELLY,
WM. ICHILL,
JOHN R. HAYES.